United States Patent [19]

Gandini

[11] 4,053,222

[45] Oct. 11, 1977

[54] ILLUMINATING APPARATUS FOR PHOTOGRAPHIC COLOR ENLARGER

[75] Inventor: Mario Gandini, Brixen, Italy

[73] Assignee: Durst AG. Fabrik Fototechnischer Apparate Bozen, Bolzano-Bozen, Italy

[21] Appl. No.: 685,975

[22] Filed: May 13, 1976

[30] Foreign Application Priority Data

May 20, 1975 Italy ................................. 4827/75

[51] Int. Cl.² ........................................ G03B 27/76
[52] U.S. Cl. ................................................ 355/71
[58] Field of Search ............... 355/67, 71, 70, 32, 355/35, 37

[56] References Cited

U.S. PATENT DOCUMENTS

| 2,997,389 | 8/1961 | Boon | 355/35 X |
| 3,923,394 | 12/1975 | Frankiewicz | 355/70 X |
| 3,927,941 | 12/1975 | Yamaguchi | 355/71 |

FOREIGN PATENT DOCUMENTS

| 163,572 | 1/1934 | Switzerland | 355/71 |
| 892,731 | 1/1944 | France | 355/35 |

Primary Examiner—Donald A. Griffin
Attorney, Agent, or Firm—Connolly and Hutz

[57] ABSTRACT

The color mixing compartment of illuminating equipment for a photographic enlarger includes two parts. The part adjacent the light-admitting surface is a truncated pyramid. The part adjacent the light-emerging surface is substantially a parallelepiped having side faces disposed substantially perpendicularly to the light-emerging surface. A diffusing plate having a substantially uniform thickness is arranged at the light-admitting and light-emerging surfaces of the mixing compartment.

7 Claims, 3 Drawing Figures

ILLUMINATING APPARATUS FOR PHOTOGRAPHIC COLOR ENLARGER

BACKGROUND OF THE INVENTION

The invention relates to illuminating equipment, particularly for photographic color-enlarging apparatus with a color-mixing compartment.

In known photographic color enlargers, illuminating equipment is employed wherein color filters in the three subtractive primary colors are continuously inserted into the beam of rays of a light source emitting white light, the color composition of the copying light being changed depending on the depth of insertion of the individual color filters into the beam. Since the individual color filters usually intersect only a portion of the beam of rays, the color distribution over its cross section is not homogeneous, so that suitable color mixing means must be provided for homogenizing the color distribution of the copying light before the light reaches the original to be copied. Such color-mixing means comprise mixing compartments with reflecting inner surfaces, which are provided for an intensification of the mixing effect and have light-diffusing plates, usually at the ends where the light enters and/or emerges from. The light-diffusing plates at the light emerging side moreover affect the distribution of brightness. This is achieved by means of light-diffusion plates with variously distributed degrees of transmission, which in the center of the light-emerging surface should be smaller than in its peripheral areas, in order that the peripheral areas may appear brighter and thus an even light distribution is obtained and/or lens vignetting is counteracted. Light-diffusing plates are employed for this purpose whose thickness decreases toward the edges.

A good color mixture in these known apparatus is achieved only by relatively large color-mixing compartments, something which involves a double drawback of high light losses on the one hand and of influencing the structural size of the respective illuminating equipment by the dimensions of the color-mixing compartment. Color-mixing compartments can be shortened with the same mixing effect as compared to known designs if diffusing plates with increased diffusing effect are simultaneously employed which, however, again causes very high light losses. In addition, with a shortening of the color-mixing compartment, it must be taken into consideration that the light distribution at the light-emerging surface will deteriorate, which can be counteracted only by the use of a diffusion plate whose thickness is very much greater in the center of the light-emerging surface than towards the edges.

The object of the invention is to provide an illuminating device of the above-mentioned type, which makes possible a shortening of the color-mixing compartment as well as the use of an even diffusing plate at its light-emerging surface without thereby deteriorating the color-mixing conditions and the light distribution as compared to known devices.

SUMMARY OF THE INVENTION

In accordance with this invention, the color mixing compartment of illuminating equipment for a photographic enlarger includes two parts. The part adjacent the light-admitting surface is constructed and arranged as a truncated pyramid. The part disposed adjacent the light-emerging surface is constructed and arranged substantially as a parallelepiped having side faces disposed substantially perpendicularly to its light-emerging surface. The inclination of the sides of the part adjacent the light-emerging surface may be slightly inclined from the perpendicular to the light-emerging surface at angles ranging from about −15° to +15°. The light-emerging surface has a diffusing plate having a substantially uniform thickness arranged at it. By means of the novel embodiment of the color-mixing compartment about a 50% shortening of the light-mixing course can be obtained as compared to the known embodiments, whereby a significant increase in the light yield may be achieved. In addition, the intensity of the light at the light-emerging surface is distributed in such a manner that instead of the previously used diffusing plates having thickness decreasing toward the edges, diffusing plates of uniform thickness may be employed, which provides a great saving in cost in comparison to the previously known devices, because diffusing plates whose thickness is not uniform over their entire expanse can be manufactured only at great expense.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
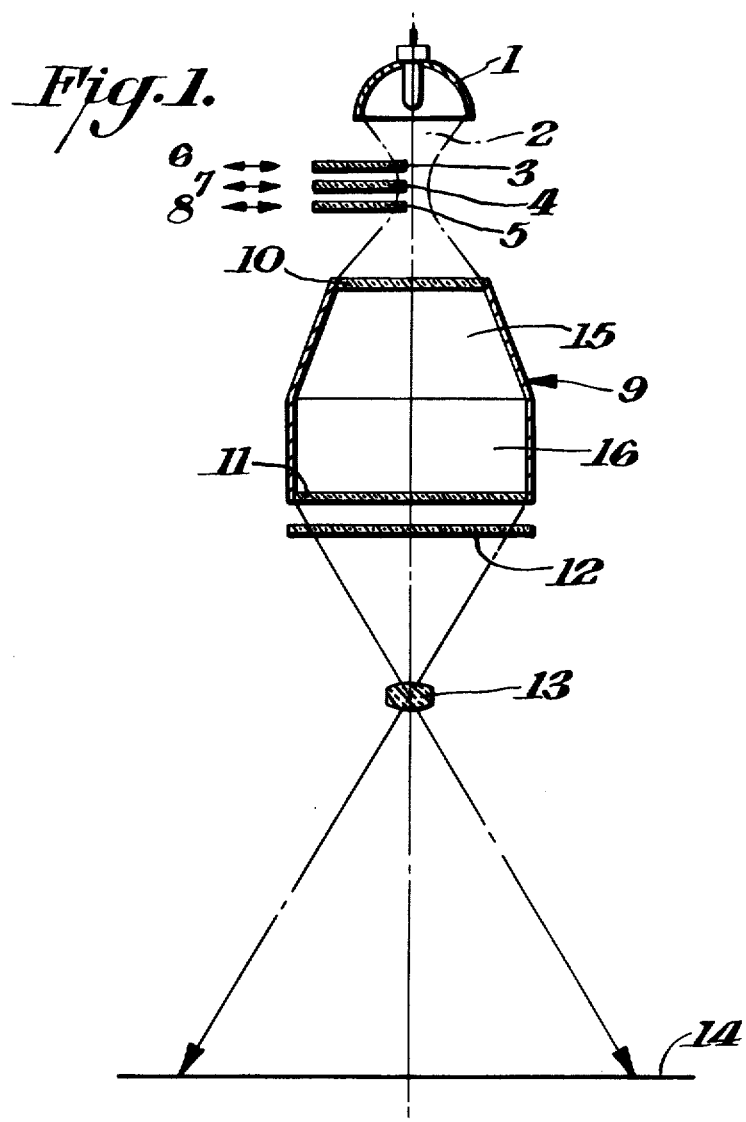
FIG. 1 is a schematic illustration of a novel illuminating device of this invention, partially in cross-section.

In a known manner, color filters 3, 4, 5 are insertable in the direction of arrows 6, 7, 8 into a beam of rays 2 emanating from a light source 1. The individual color filters 3, 4, 5 each pertain to a subtractive primary color and hold back the primary color portion of the light corresponding to its blocking characteristic, which increases the deeper they are inserted into the beam of rays 2. The beam of rays 2, having in its cross section a generally inhomogeneous color distribution, is conducted into a color-mixing compartment 9 (shown in cross section) whose light-admitting or light-emerging surfaces are covered by a uniform diffusing plate 10 or 11, each of whose diffusing effect is uniform over its entire expanse. Arranged below the color-mixing compartment 9 is the picture original 12 to be copied.

Color-mixing compartment 9 is comprised of two interconnected parts of which the part 15 adjacent the light source 1 has the shape of a truncated pyramid and the part 16 adjacent the picture original 10 has the shape of a parallelepiped. Such a design of the color-mixing compartment 9 affords good color mixing and at the same time a good light distribution, so that in the projection plane 14 on which the picture original 10 is projected through a lens 13, no marginal attenuation of the light intensity is registered. By means of the reflecting surfaces of the parallelepiped part of the light compartment, arranged normally to the light-emerging surface, a brightening of the marginal areas of the light-emerging surface is achieved, so that lens vignetting is counteracted.

Figure 2:
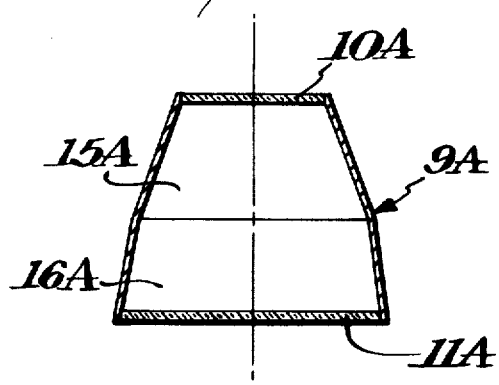
FIG. 2 is a variation of the color-mixing compartment in FIG. 1, which comprises another embodiment of this invention.
Figure 3:
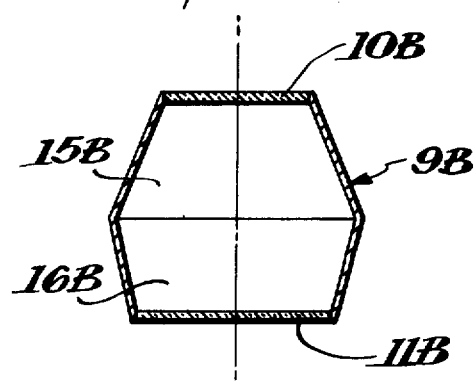
FIG. 3 is a further variation of the color-mixing compartment in FIG. 1, which comprises a further embodiment of this invention.

FIGS. 2 and 3 show a change in the incline of the side faces of the part of the color-mixing compartment adjacent the light-emerging surface as compared to the design illustrated in FIG. 1 The color-mixing compartment 9A is comprised in these designs of two interconnected parts in the form of truncated pyramids. A slight positive (obtuse) or negative (acute) incline of the side faces of the color-mixing compartment in comparison to the normal line to the light-emerging surface affects the degree of the brightening in the marginal areas of the illuminated surface, so that, depending on the dimensions of the color-mixing compartment and of the light-emergence surface, the brightness distrubution most suitable in a particular case can be achieved. Due to the shape of the color-mixing compartment illustrated in FIG. 2, the marginal areas are illuminated less than is the case with side faces of the color-mixing compartment arranged normally to the light-emerging surface, while the incline of the side faces in the color-mixing compartment illustrated in FIG. 3 effects a stronger illumination of the marginal areas. Such positive or negative inclination can range from about 75° to 105° to the light emergence surface and obtain the object of this invention. Suitable angles for the sides of the light-admitting part 15 to the light-admitting surface 10 are from about 35° 120°.

The design of the color-mixing compartment part 16 with side faces arranged normally to the light-emergence surface in manufacture is the most suitable for realizing the object of this invention.

The design illustrated in FIG. 1 is essentially schematic and serves only for an explanation of the function of the color-mixing compartment 9. It is feasible to provide further color-mixing means between the light source 1 and the color-mixing compartment 9 for an intensification of the mixing effect.

I claim

1. An illuminating apparatus for a photographic color enlarger comprising a color-mixing compartment having light-admitting and light-emerging surfaces, the color-mixing compartment having a first part disposed adjacent its light-admitting surface directly connected to a second part disposed adjacent its light-emerging surface, the first part having sides disposed at a substantial obtuse angle relative to the light-admitting surface in the form of a truncated pyramid, the second part having sides disposed substantially perpendicularly to the light-emerging surface substantially in the form of a parallelepiped head whereby a substantially uniform illumination of the light-emerging surface is obtained.

2. An illuminating apparatus as set forth in claim 1 wherein the sides of the second part are disposed at an angle of about −15° to +15° to the perpendicular to the light-emerging surface.

3. An illuminating apparatus as set forth in claim 2 wherein the sides of the first part are disposed at an angle to the light-admitting surface of from 95° to 120°.

4. An illuminating apparatus as set forth in claim 1 wherein a light-diffusing means is disposed at the light-emerging surface, and the light-difussing means has a substantially uniform thickness.

5. An illuminating apparatus as set forth in claim 4 wherein the light-diffusing means comprises a light-diffusing plate having a substantially uniform thickness.

6. An illuminating apparatus as set forth in claim 5 wherein a light-diffusing plate is also disposed at the light-admitting surface.

7. An illuminating apparatus as set forth in claim 6 wherein the sides of the second compartment are disposed at an angle of about −15° to +15° to the perpendicular to the light-emerging surface, and the sides of the first part are disposed at an angle to the light-admitting surface of from about 95° to 120°.

* * * * *